March 28, 1939.  E. T. TURNER  2,151,949
METHOD AND APPARATUS FOR CONVERTING HEAT ENERGY INTO MECHANICAL ENERGY
Filed July 30, 1934  5 Sheets-Sheet 2
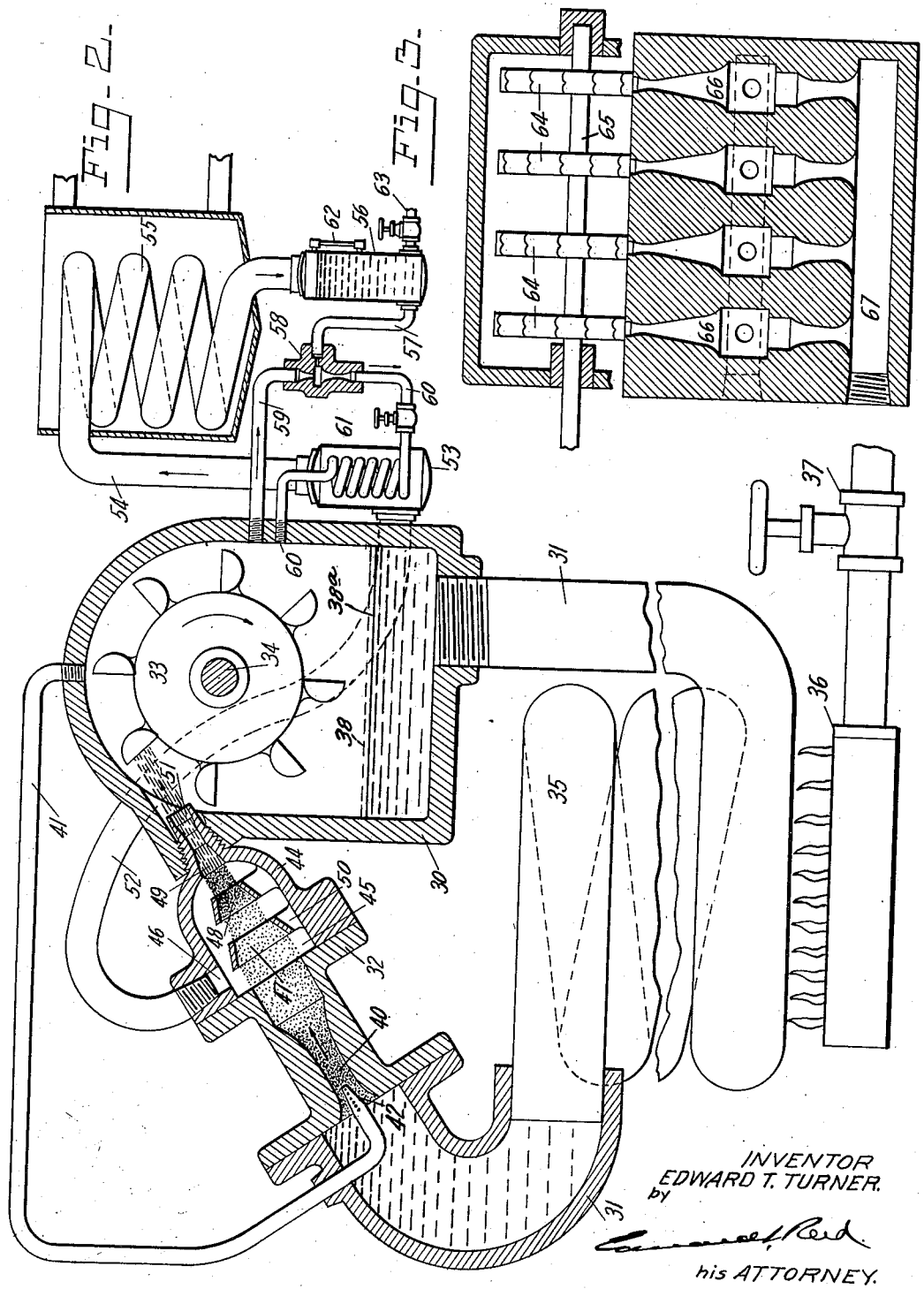
INVENTOR
EDWARD T. TURNER.
by
his ATTORNEY.

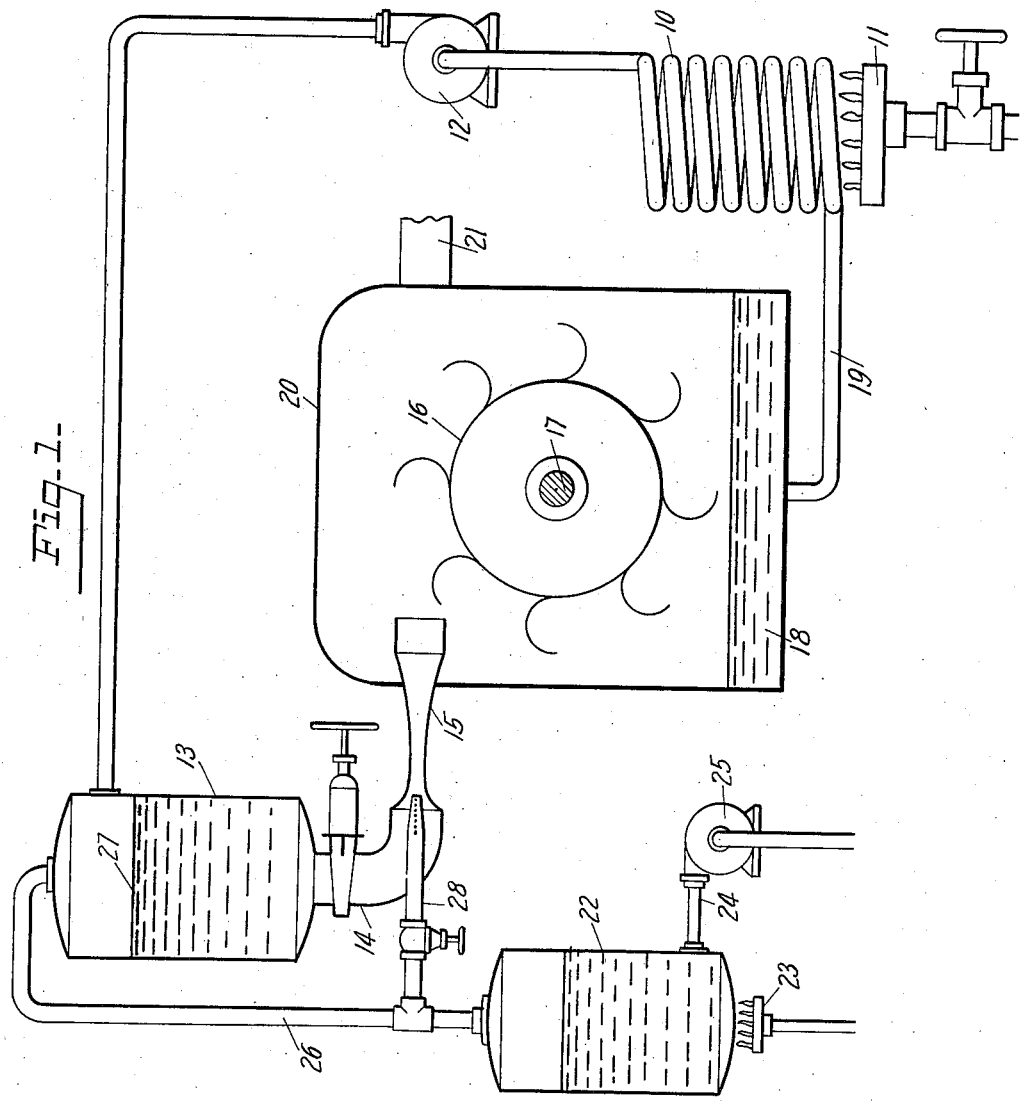

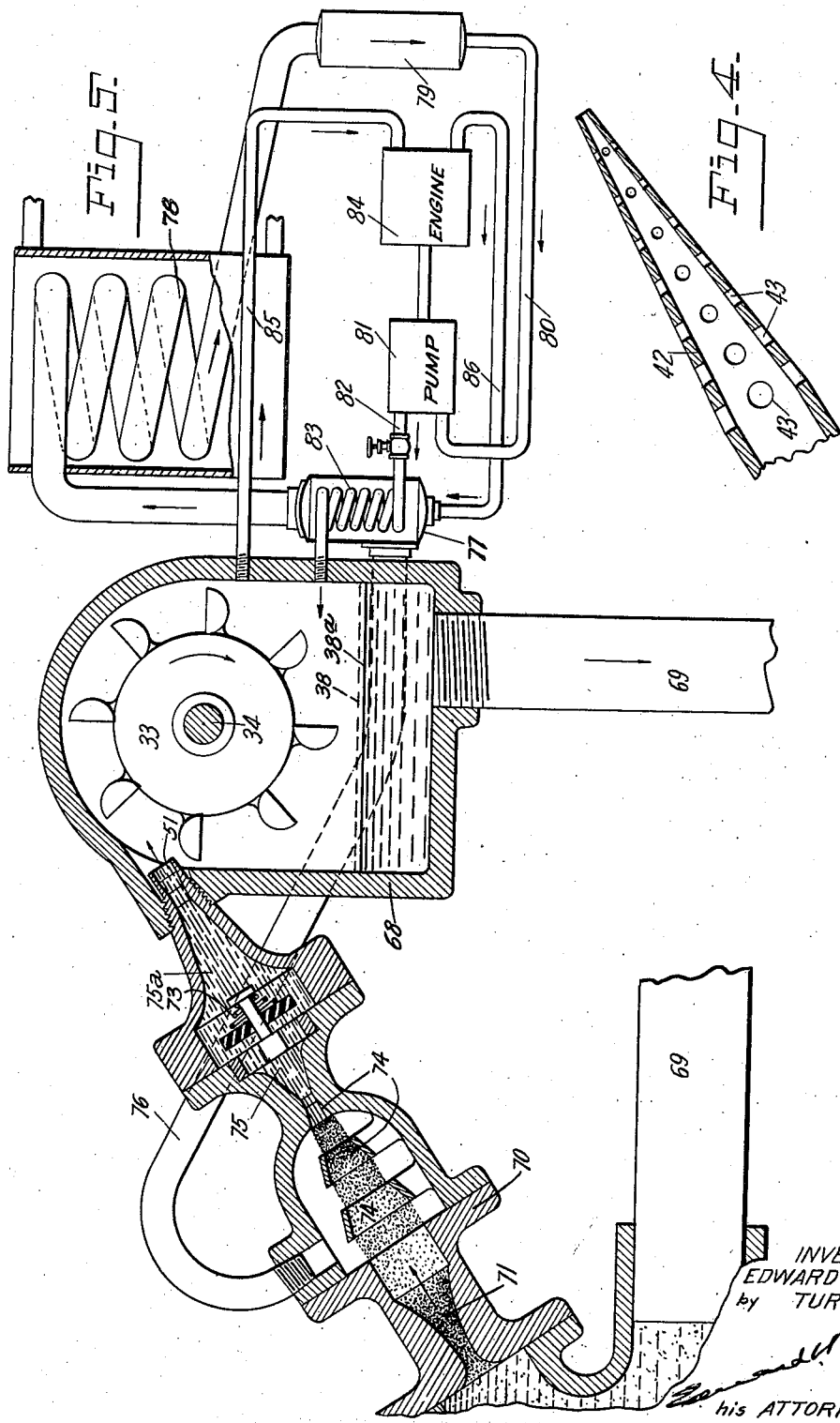

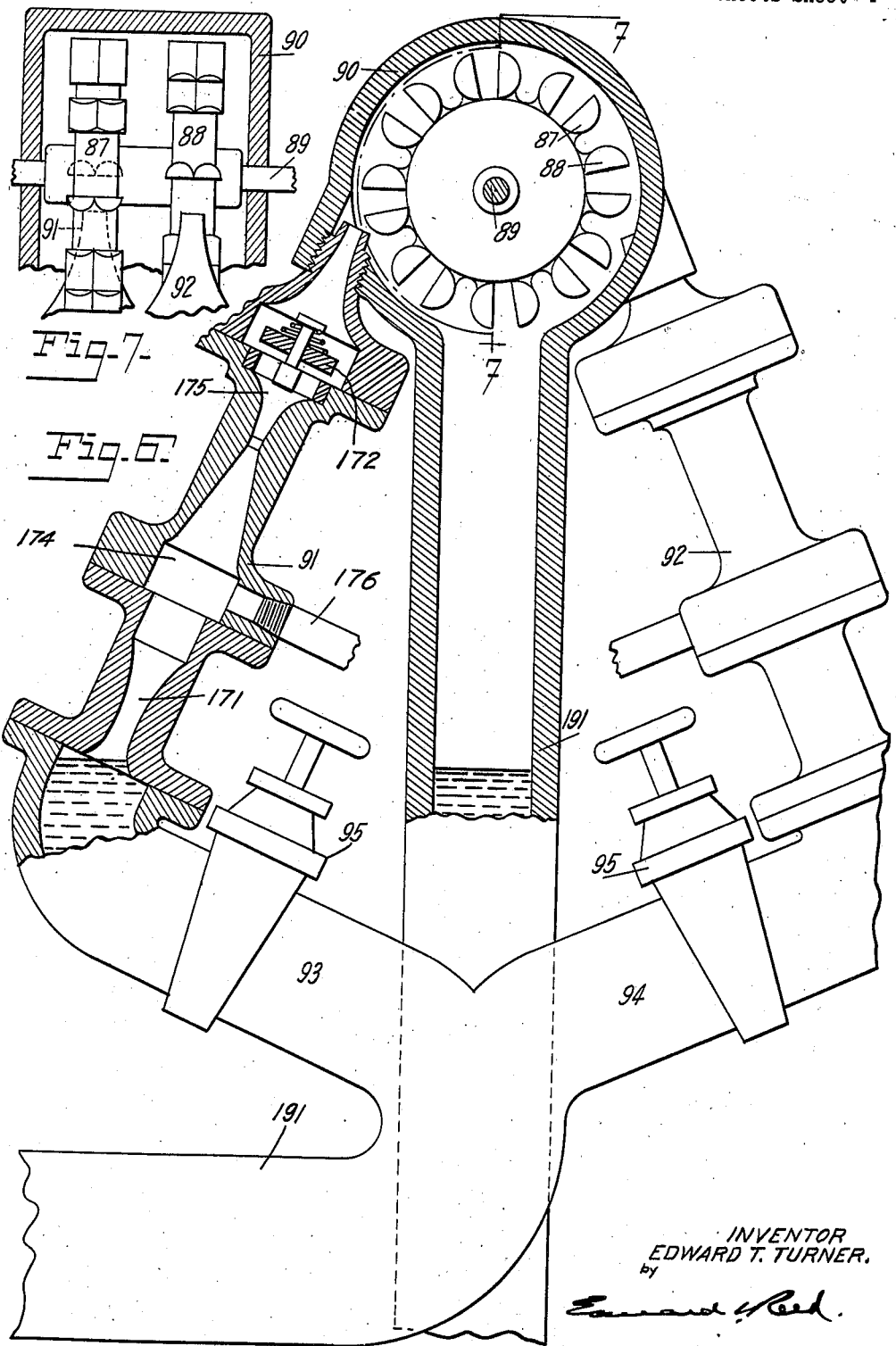

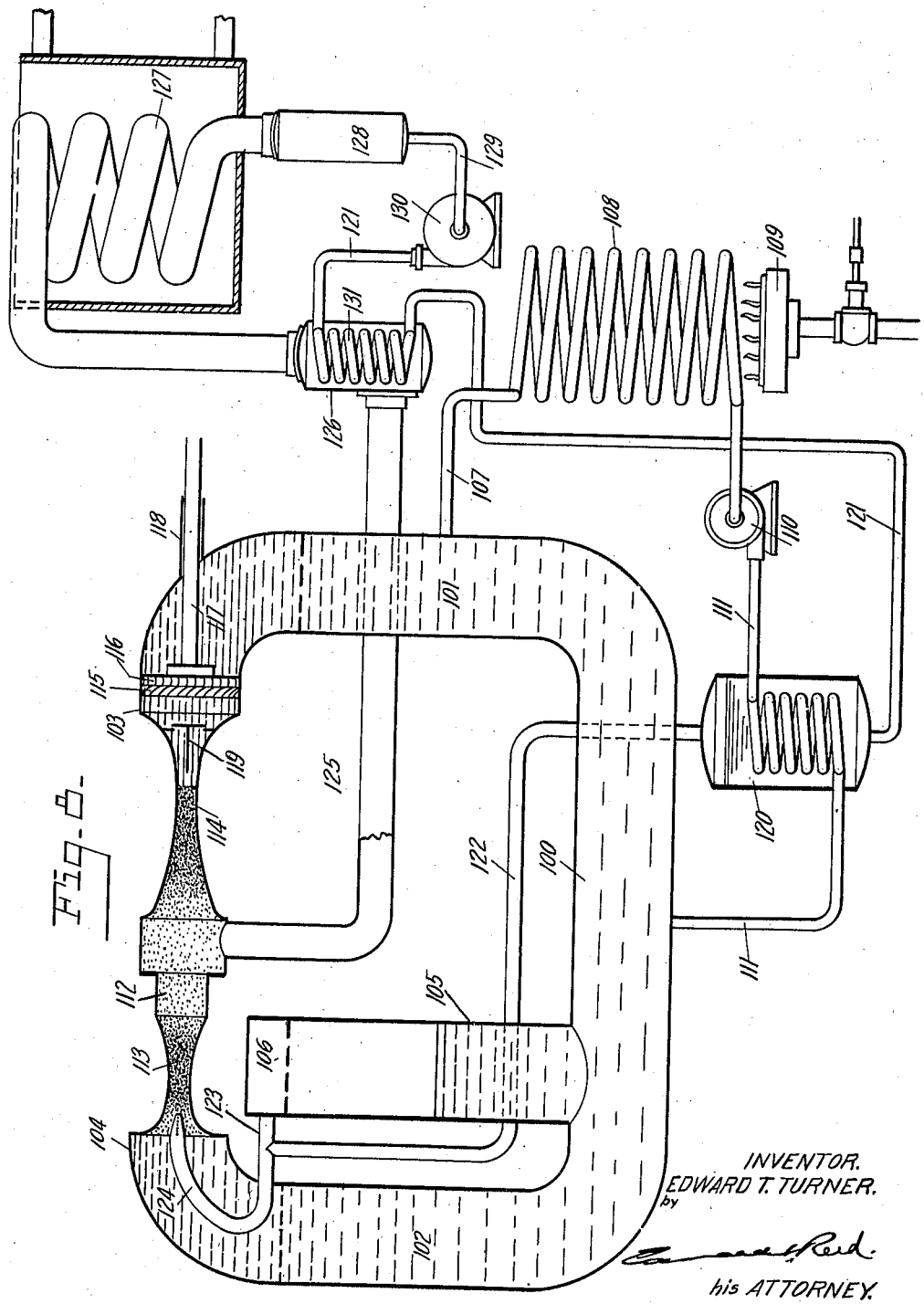

Patented Mar. 28, 1939

2,151,949

UNITED STATES PATENT OFFICE 2,151,949

METHOD AND APPARATUS FOR CONVERTING HEAT ENERGY INTO MECHANICAL ENERGY

Edward T. Turner, Dayton, Ohio

Application July 30, 1934, Serial No. 737,601

31 Claims. (Cl. 60—40)

This invention relates to a method and apparatus for converting heat energy into mechanical energy and the primary object of the invention is to provide an efficient method of effecting the conversion and to provide a simple, compact and inexpensive apparatus for performing the method.

A further object of the invention is to provide a method and means for converting vapor pressure energy into liquid velocity energy and utilizing the velocity energy of the liquid to operate a power element, such as a water wheel.

A further object of the invention is to provide a method and means for effecting isothermal expansion of the vapor in the process of converting vapor pressure energy into liquid velocity energy.

A further object of the invention is to provide such a method and apparatus in which the operation of the power element may be controlled by controlling the application of heat to the apparatus.

A further object of the invention is to provide such a method and apparatus which will require a relatively small quantity of vapor and in which the condenser may be of correspondingly small capacity.

A further object of the invention is to provide such an apparatus in which the torque may be modified and the direction of operation reversed without the use of gears.

Other objects of the invention will appear as the method and apparatus are described in detail.

In the accompanying drawings Fig. 1 is a diagrammatic illustration of a simple apparatus for performing the more essential steps of the method; Fig. 2 is a side elevation, partly in section, and partly broken away, of a second form of apparatus for performing the method; Fig. 3 is a sectional detail view of a portion of an apparatus in which the power element comprises a plurality of water wheels; Fig. 4 is a sectional detail view of the nozzle or discharge head for introducing vapor under pressure into the propellant; Fig. 5 is a side elevation partly in section, and partly broken away, illustrating a modification of the apparatus in Fig. 2; Fig. 6 is a detail view of a portion of an apparatus partly in section, showing a reversible power element; Fig. 7 is a section taken on the line 7—7 of Fig. 6 and showing the power elements in elevation; and Fig. 8 is a diagrammatic illustration of another form of apparatus for performing the method.

In these drawings I have illustrated certain forms of apparatus by which my method may be carried out, each form of apparatus contemplating minor changes in the method. It will be understood, however, that these several apparatuses are shown for the purpose of illustration only and that various forms of apparatus may be provided for carrying out the method.

In carrying out my method I intimately mix vapor under pressure with a liquid propellant, also under pressure, and at a high temperature, the temperature of the propellant being preferably equal to or in excess of the temperature of vaporization of the vapor at said pressure, and pass the mixture through an expansion chamber wherein the pressure energies are converted into velocity energy. The propellant may consist of any suitable substance having a relatively high boiling point, such as oil or mercury, or metal which will fuse at a relatively low temperature, such as lead or tin. Various vapors are suitable for the purpose but I prefer to employ a liquid which can be vaporized at a temperature substantially less than the boiling point of the propellant. The several forms of apparatus here shown contemplate the use of water which is converted into steam. I wish it to be understood, however, that the term "vapor" as herein used is intended to include any elastic fluid under pressure which is suitable for the intended purpose.

The vapor enters the expansion nozzle at a substantially fixed and predetermined pressure and, of course, expands within the chamber to a definite exhaust pressure at the discharge end of the chamber, the exhaust pressure being predetermined, in part at least, by the shape of the expansion chamber. The velocity energy of the propellant as it leaves the expansion chamber is substantially equal to the sum of its original pressure energy and the velocity energy imparted to it by the expansion of the vapor therein during its passage through the expansion chamber.

The mass of the propellant within the expansion chamber is many times greater than the mass of the vapor, and the heat transmitted from the propellant to the vapor within the expansion chamber is negligible as compared to the total heat content of the propellant therein and the temperature drop of the propellant within the expansion chamber will be negligible, resulting virtually in isothermal expansion within the expansion chamber. By properly proportioning the ratio of the propellant mass to the vapor mass and by properly varying the expansion ratio within the expansion chamber it is possible to obtain a very wide range of propellant velocities.

As the finely dispersed propellant leaves the expansion chamber it is passed through a tapered passageway, or "squeezer", which brings the particles of the propellant together en masse without materially reducing their velocity and without trapping any substantial portion of the vapor in the propellant. It then has velocity energy sufficient to return it to its initial pressure and to provide the power for which the apparatus is designed, there being available for power purposes substantially all the velocity energy imparted to the propellant through the expansion of the vapor within the pressure chamber.

Preferably the propellant is circulated through a closed circuit which includes the expansion chamber and the squeezer, and in which the power element is located, and it is important that the propellant shall be returned to its original pressure. For that purpose a portion only of the velocity energy of the propellant is converted into pressure energy, leaving for power purposes the greater portion of the energy which has been imparted to the propellant through the isothermal expansion of the vapor.

The expanded vapor is separated from the propellant immediately after the mixture passes out of the expansion chamber and this separated vapor may be again utilized by condensing the same and then vaporizing it. Inasmuch as the vapor at the time of its separation is superheated I prefer to utilize this heat to preheat the condensed vapor prior to revaporization of the same and thus reduce the cost of heat which is required to revaporize the condensed vapor.

The energy of the propellant may be utilized in various ways, as by causing the same to operate a suitable power element. Such a power element may be of any suitable character and may conveniently be a water wheel, such as a Pelton wheel, which is operated directly by the velocity energy of the liquid; or it may be of the type which is operated by fluid under pressure, such as a turbine, and it would then be preferable to convert all the velocity energy of the propellant into pressure energy; or it may be of such a character as to utilize both pressure and velocity energy.

In Fig. 1 of the drawings I have shown a very simple apparatus for performing my method in which the liquid propellant is circulated through a circuit including a heater, an expansion chamber and a power element. The heater is shown as a coil of pipe 10 arranged above a burner 11 and connected with the intake of a pump 12 by means of which the liquid is delivered to the upper portion of a receptacle 13 constituting a pressure chamber. Connected with the lower end of this pressure chamber is a conduit 14 which terminates in a nozzle-like structure 15 which constitutes the expansion chamber, and the outlet end of which is directed toward the power element, here shown as a Pelton wheel 16 mounted on a shaft 17. The Pelton wheel and its shaft are arranged above a catch basin 18 which is connected by a pipe 19 with the heating coil 10. In the present instance, the catch basin forms a part of a casing 20 which encloses a power element and which is provided with an outlet 21. In this apparatus the vapor is formed externally of the circuit and is delivered thereto by suitable conduits. As shown, the vaporizer comprises a receptacle or boiler 22 arranged above a heater 23 and connected with a source of water supply by means of a pipe 24 and pump 25. A pipe 26 leads from the upper end of the vaporizer to the upper end of the pressure chamber 13 and the vapor is delivered to the pressure chamber under high pressure and acts on the liquid propellant which is contained in the pressure chamber, as shown at 27, to force the same through the expansion nozzle 15 which is so shaped as to convert the pressure energy of the propellant into velocity energy. A branch pipe 28 connected with the vaporizer 22 extends into the conduit 14 and is arranged to discharge vapor under pressure into that conduit and cause the same to be intimately mixed with the propellant therein and in the present arrangement, the vapor is mixed with the propellant just as the latter enters the expansion chamber of the nozzle and the vapor and propellant move together through the nozzle, the vapor expanding as the pressure of the propellant decreases to impart an increased velocity to the propellant. The propellant is thus discharged into the casing 20 and against the blades of the Pelton wheel, and the vapor separates therefrom and escapes through the outlet 21. While this apparatus will operate in a satisfactory manner it does not have as high an efficiency and is not so well adapted for commercial use as some other forms of apparatus.

In that form of apparatus shown in Fig. 2 the propellant is circulated through and heated in a closed circuit and the vapor is generated within that circuit by the heat of the propellant. In the particular construction illustrated the circuit comprises an enlarged portion or casing 30 forming a pressure chamber which is connected by a conduit 31 with a nozzle structure 32, the discharge end of which opens into the pressure chamber 30 and is directed toward the blades of a Pelton wheel 33, which is secured to a shaft 34 mounted in the walls of the pressure chamber. The conduit 31 is provided with a heating element here shown as a coil 35 arranged above a burner 36, the operation of which is controlled by a valve 37 in the fuel supply pipe. The circuit contains a liquid propellant which, as above explained, may be of any suitable character, in such a quantity that when the apparatus is idle the propellant will rise a short distance above the bottom of the pressure chamber, as shown at 38. The circuit also contains a relatively small quantity of liquid having a relatively low boiling point, such as water. When the apparatus is idle there may be a small quantity of water on top of the propellant, but the liquid is fed into the pressure chamber in small quantities and when the apparatus is in operation will be quickly vaporized by the heat from the propellant, which is maintained at a very high temperature, say 500° to 600° F. The vapor or steam is confined in the pressure chamber under pressure and acts upon the propellant therein to force the same through the conduit 31 and nozzle structure 32. The nozzle comprises a portion 40 constituting an expansion chamber which is so shaped that as the propellant flows through the same its pressure energy will be converted into velocity energy.

Vapor or steam from the pressure chamber may be mixed with the propellant in any suitable manner but in this form of apparatus a small steam pipe 41 leads from the upper portion of the pressure chamber and extends into the conduit 31 where it is provided with a discharge head 42, which preferably extends into the intake end of the expansion chamber, so that vapor or steam under pressure is discharged into the expansion chamber along with the propellant and as the pressure of the propellant decreases the vapor expands and imparts increased velocity energy to the propellant. The discharge head 42 of the steam pipe is preferably in the form of a tapered nozzle having a plurality of series of lateral outlet ports 43. It is desirable that substantially equal quantities of vapor should be discharged through each of the lateral ports and inasmuch as the pressure of the propellant decreases toward the small end of the nozzle and thus offers less resistance to the passage of the vapor through the ports 43 I have made the ports of progressively decreasing size as they approach the small end of the nozzle, as shown in Fig. 4.

The nozzle structure is provided beyond the expansion chamber 40 with a discharge portion 44 having a tapered passageway through which the propellant is passed to render the same more compact, as heretofore explained. This discharge portion of the nozzle is provided with an enlarged portion 45 adjacent to the outlet for the expansion chamber and as the mixture of propellant and vapor is discharged from the expansion chamber the vapor, which is elastic and has a lower specific gravity than the propellant, will escape from the propellant into the chamber 45 and pass through a port 46 in the wall of the chamber. Due to the mass and inertia of the propellant very little if any of the same will separate from the jet or column of propellant liquid and remain in the separating chamber. However, all the vapor will not thus be separated from the propellant and the squeezer is provided to expel additional vapor from the propellant. The squeezer, which may be of any suitable character, is here shown as a tapered passageway and in order that this vapor may reach the port 45 I have made the tapered passageway in a plurality of sections, 47 and 48 and 49, which are spaced apart so that such vapor as may separate from the propellant during its passage through this tapered passageway may escape between the sections of the passageway and thus flow rearwardly to the port 46. In the particular arrangement here shown the sections 47 and 48 are in the form of tapered rings, the ring 48 being of less diameter than the ring 47, and the third section 49 is formed in the body of the nozzle structure. The rings 47 and 48 are supported in alinement one with the other by brackets 50 secured to the nozzle.

The casing 30 in which the power element or Pelton wheel 33 is located contains vapor under high pressure and it is necessary that the pressure of the propellant should at least equal the pressure in the pressure chamber, in order that the propellant may enter the same. I therefore convert a part of the velocity energy of the propellant into pressure energy, this being accomplished by providing the outlet from the nozzle with a slight flare. A very slight flare will be sufficient to produce the desired pressure energy and the flare shown at 51 is exaggerated for the purpose of illustration.

During the initial heating of the apparatus the water in the pressure chamber 30 will be heated as the temperature of the propellant rises and will be converted into steam which will be confined within the pressure chamber. When the propellant reaches its normal operating temperature the steam confined within the pressure chamber will be at high pressure and at high temperature and water entering the pressure chamber will be almost instantaneously converted into steam. During the initial heating of the propellant some steam may pass to the nozzle at 51 and will escape from the nozzle and be condensed and returned to the pressure chamber, as hereinafter described. The amount of steam thus escaping is so small that it does not materially affect the pressure of the steam on the propellant in the pressure chamber and the pressure in the nozzle being low as compared with the pressure in the pressure chamber the propellant will be forced through the conduit 31 and through the nozzle. As soon as a slight pressure has been developed the flow of propellant through the nozzle into the pressure chamber will, of course, prevent the escape of any steam at 51. There will be a slight pressure drop in the propellant between the pressure chamber and the entrance to the expansion chamber, due to friction losses and the like, and the intake to the expansion chamber is so shaped as to convert some pressure energy into velocity energy and thus cause a further drop in the propellant pressure. While this drop in pressure may be slight nevertheless it results in the propellant pressure at the intake to the expansion chamber being lower than the steam pressure in the pressure chamber 30. Hence the steam can pass from the pressure chamber through the pipe 41 and nozzle 42 into the propellant. The steam escapes from the nozzle 42 through restricted apertures which throttle the same and cause it to be intimately mixed with the propellant. The steam which is thus intimately mixed with the propellant expands isothermally within the expansion chamber to a predetermined exhaust pressure at the discharge end of the chamber, thus causing the propellant to be discharged from that chamber at high velocity. A portion of the velocity energy of the propellant is then converted into pressure energy to overcome the steam pressure within the pressure chamber and the propellant is discharged into that chamber and caused to actuate the power element therein.

In Fig. 2 I have shown the approximate levels of the propellant when the apparatus is in operation. The level of the propellant in the pressure chamber will be lowered from the idle level shown at 38 to approximately the level shown at 38a. The conduit 31 will be filled with propellant under pressure containing very little if any steam. As the propellant enters the expansion chamber 40 of the nozzle it is mixed with and expanded within the steam entering through the nozzle 42 and this mixture, in an expanded condition, will enter the squeezer 47 and after the steam has been separated from the propellant the latter will be discharged from the nozzle into the pressure chamber, little or no steam entering the propellant chamber with the propellant.

The port 46 of the separating chamber of the nozzle is connected by a conduit 52 with a receptacle 53, which in turn is connected at its upper end with a conduit 54 leading to a condenser 55. This condenser may be of any suitable character but is here shown merely as a coil about which water or air may be circulated. The condenser discharges into a receiver 56 and the condensed vapor or liquid is taken from the receiver by a pipe 57 and returned to the pressure chamber, where it is again vaporized. In order to inject the condensed vapor into the pressure chamber, against the high pressure therein, I have in this form of the apparatus utilized an injector 58 similar to that used for injecting water into a steam boiler. The intake end of this injector is connected by a pipe 59 with the pressure chamber and the discharge end of the injector is connected by a pipe 60 with the pressure chamber. The pipe 57 leading from the receiver 56 for condensed vapor is connected with the injector passageway between the inlet and outlet ends thereof and the passage of steam through said injector withdraws the liquid from the receiver and carries the same into the pressure chamber. The vapor when separated from the propellant has a temperature approximately equal to that of the propellant and in order that this heat may be utilized to preheat the condensed vapor before the latter is returned to the pressure chamber for revaporization the receptacle 53 is provided between the nozzle 32 and the condenser, and the pipe 60 which conducts the condensed vapor to the pressure chamber is provided with a coil 61 arranged within the receptacle 53. Thus the separated vapor passing at high temperature about the coil 61 will preheat the condensed vapor therein, and at the same time the heat given up to the condensed vapor will lower the temperature of the uncondensed vapor, thereby permitting the use of a condenser of relatively small capacity. The preheating of the condensed vapor reduces the cost of the heat necessary to vaporize the same and the use of a condenser of small capacity reduces condensing costs. It is desirable that the condensed vapor in the receptacle 56 should be maintained at a level above the point at which the pipe 57 enters the injector. The receptacle is therefore provided with a sight glass 62 by which any fall in the level of the condensed vapor, due to leakage or otherwise, may be detected and additional liquid supplied through a valve controlled supply pipe 63.

The power element may consist of a single element, or water wheel, and this element may vary in size but I prefer to have the water wheel of small diameter and when additional power is desired this may be secured by mounting a plurality of water wheels 64 on a single shaft 65, as shown in Fig. 3, and providing each water wheel with a separate nozzle 66, the several nozzles being preferably connected with the conduit through a manifold or header 67.

In Fig. 5 I have illustrated a modification of the apparatus shown in Fig. 2, in which the condensed vapor or liquid is mixed with the liquid propellant as the latter leaves the pressure chamber. As there shown, the circuit is substantially similar to that shown in Fig. 2, and comprises a casing 68 forming a pressure chamber which is connected by a conduit 69 with a nozzle structure 70. The conduit 69 is provided with means for heating the propellant therein, which is not shown but which may be similar to that shown in Fig. 2. In this form of the apparatus it is preferable that the specific gravity of the propellant shall be equal to or less than the specific gravity of the condensed vapor or liquid, such as oil and water, and the condensed vapor or liquid which is delivered to the pressure chamber will be mixed with and drawn into the propellant as the latter enters the conduit 69. When the pressure in the chamber 68 is equal to or above the pressure corresponding to the temperature of vaporization, liquid may be retained in the chamber in liquid form. The temperature of a volatile liquid in the chamber 68 will be substantially equal to the temperature of the propellant. The pressure in the chamber will be that pressure which corresponds to a temperature of vaporization equal to the temperature of the liquid, and, for example, with a propellant temperature of five hundred degrees in the chamber, the pressure therein will be about 740 pounds and the liquid will be vaporized only to an extent sufficient to maintain that pressure. The propellant and the liquid entering the chamber are thoroughly intermixed or dispersed one within the other, due to the turbulence within the chamber caused by the entering propellant and the action of the water wheel, and influenced to some extent by the entering liquid. Therefore the greater part of the liquid will be carried with the propellant into the conduit 69. However, the propellant being under pressure the liquid thus mixed therewith is prevented from vaporizing. As the propellant flows through the conduit there will be a tendency toward a slight decrease in its pressure, due to frictional losses, which will permit a slight vaporization of the liquid in the propellant and when the propellant, with the liquid therein, is delivered to the expansion chamber 71 of the nozzle the remainder of the liquid will be vaporized and the vapor will expand and impart velocity energy to the propellant in the manner above described.

In the construction shown in Fig. 2 the nozzle is in open communication with the pressure chamber and during the initial heating of the propellant, and before sufficient pressure has been developed to operate the apparatus, some vapor may escape from the pressure chamber into the nozzle. However, the vapor so escaping in the nozzle will be small in amount and will be returned through the condenser to the pressure chamber. In Fig. 5 means are provided for preventing the flow of vapor in a reverse direction through the nozzle and for that purpose the discharge portion of the nozzle has been somewhat lengthened and provided with a check valve 72 which is held normally on its seat by a light spring 73 which holds the same closed until the pressure and/or velocity in the nozzle is sufficient to open the same, and then permits it to open. Thus no steam can escape from the pressure chamber during the initial heating of the apparatus but as soon as any substantial pressure is created in the pressure chamber the check valve will open and permit the apparatus to operate in the manner set forth. It will be noted that the check valve is arranged beyond the squeezer, comprising the separated sections 74 of the tapered passageway for the propellant, and the nozzle is provided in advance of the check valve with a flared passageway 75 which converts the velocity energy, or a substantial part thereof, into pressure energy, which opens the valve and permits the passage of the propellant to a tapered portion 75a of the nozzle structure which reconverts a portion of the pressure energy into velocity energy and discharges the propellant against the Pelton wheel.

The vapor which is separated from the propellant in the nozzle passes through a return pipe 76, receptacle 77 and condenser 78 to a receiver 79 from which it is returned to the pressure chamber but in this form of the apparatus I have used a power operated pump instead of an injector for returning the condensed vapor to the pressure chamber. As here shown, the receptacle 79 is connected by a pipe 80 to the intake of a pump 81, the outlet of which is connected by a pipe 82 with the pressure chamber, this pipe being provided with a coil 83 arranged in the receptacle 77 for the purpose of preheating the condensed vapor. The pump 81 may be operated by any suitable motor, such as a fluid operated motor or steam engine 84 which is supplied with steam from the pressure chamber through a pipe 85 and is connected by a pipe 86 with the receptacle 77, so that the exhaust steam will pass through the receptacle 77 to the condenser and will be thus condensed and returned to the pressure chamber.

In Figs. 6 and 7 I have illustrated a simple method of reversing the direction of operation of the power element and as there shown the construction and operation are similar to those of the apparatus of Fig. 5, with the addition of the reversing feature. The power element comprises two water wheels 87 and 88 mounted on a single shaft 89 which is mounted in the enlarged portion or casing 90 of a conduit 191, this casing and the adjacent portion of the conduit constituting the pressure chamber. The two water wheels, which are here shown as Pelton wheels, have their blades facing in opposite directions and separate nozzles 91 and 92 are mounted to discharge into the pressure chamber and are so arranged that the nozzle 91 will discharge against the blades of the wheel 87 while the nozzle 92 will discharge against the blades of the wheel 88. Of course, only one nozzle is utilized at one time and therefore the conduit 191 is provided with branches 93 and 94 leading respectively to the nozzles 91 and 92 and each branch is provided with a valve 95 to control the flow of the propellant therethrough. Thus the direction of operation of the power element may be determined by opening one valve 95 and closing the other. The nozzles may be of any suitable type but are here shown as of the same type as in Fig. 5 and each includes an expansion chamber 171, an enlarged portion 174, a tapered passageway 175 and a check valve 172, and, if desired, may also be provided with a squeezer. That portion of the conduit between the pressure chamber and the branches 93 and 94 is provided with means for heating the liquid therein, such as the coil and heater shown in Fig. 2, and the operation will be similar to that of the arrangement shown in Fig. 5.

In Fig. 8 I have illustrated a form of apparatus for carrying out my method in which the propellant is discharged from the nozzle under pressure. As here shown, the apparatus comprises a conduit 100, the end portions 101 and 102 of which are arranged in upright positions, and substantially parallel one with the other. The upper ends of the two upright portions 101 and 102 are turned laterally one toward the other, as shown at 103 and 104. The conduit also comprises a third upright portion 105 which is here shown as arranged between the end portions 102 and in open communication therewith. The conduit contains a liquid propellant in such quantity that when the apparatus is idle the propellant will rise in the upright portions 101, 102 and 105 of the conduit to a level slightly below the top of the portion 105, as shown at 106, and this portion 105 constitutes the pressure chamber of the apparatus.

In this form of apparatus the propellant is not heated directly within the conduit but is withdrawn from the conduit, heated and then returned to the conduit. For this purpose I have connected with the upright portion 101 of the conduit a relatively small pipe 107 having therein a heating coil 108 arranged above the burner 109 and which is connected with a pump 110. The discharge side of the pump is connected by a pipe 111 with the conduit at a point beyond the point of connection of the pipe 107 with the upright portion 101. The action of the pump will withdraw the propellant from the conduit, cause the same to pass through the heating element 108 and then return the same to the conduit, thus heating the propellant within the conduit and tending to circulate the propellant through the conduit or circuit. The upper ends of the upright portions 101 and 102 are connected one to the other by a nozzle structure 112 which has a part 113 connected with the end 104 of the upright portion 102 and forming an expansion chamber in which the pressure energy of the propellant will be converted into velocity energy. The other end portion of the nozzle, as shown at 114, is connected with the upper end 103 of the upright portion 101 and is shaped to convert the velocity energy of the propellant into pressure energy and to deliver the propellant under pressure to the upper end of the upright portion 101. Mounted in the upper end of the upright portion 101 is a power element, here shown as a turbine of a known construction, which comprises a stationary element 115 and a rotary element 116 rigidly secured to a shaft 117 which extends through the wall of the upright portion 101 and is mounted in a bearing 118. A check valve 119 prevents the flow of propellant from the upright portion 101 into the nozzle during the initial heating of the propellant.

Vapor under pressure is generated exteriorly of the conduit or circuit and the heat of the propellant is utilized for vaporizing the liquid. In the construction shown a heating receptacle or boiler 120 is connected by a pipe 121 with a source of liquid supply, which will be hereinafter described, and is provided with a discharge pipe 122, which has two branches, 123 and 124. The branch 123 leads into the upper end of the upright portion 105 of the conduit, which constitutes the pressure chamber, and the vapor, which is delivered to the pressure chamber above the liquid therein, exerts pressure on the liquid propellant and forces the same out of the pressure chamber into the two upright portions 101 and 102 of the conduit, thereby substantially filling these upright portions with the propellant. The branch 124 of the vapor pipe 122 discharges into the expansion chamber 113 of the nozzle so that the vapor under pressure is mixed with the propellant and expands in the expansion chamber to impart increased velocity to the propellant.

The vapor is separated from the propellant in the nozzle 112, in the manner above described, passed through a pipe 125 to a preheating chamber or receptacle 126, the upper end of which is connected with a condenser 127. The discharge end of the condenser is connected with a receiver 128 and a pipe 129 leads from the lower end of the receiver 128 to a pump 130 from which it is delivered to the pipe 121 which supplies the condensed vapor or liquid to the boiler 120. This pipe is provided with a coil 131 arranged within the receptacle 126 to cause the condensed vapor to be preheated by the separated vapor prior to condensation of the latter.

The operation of this apparatus is substantially similar to that of the apparatus above described with the exception that the increased velocity energy of the propellant as it leaves the expansion chamber is converted into pressure energy and this pressure energy is delivered to the turbine to operate the latter in a well known manner.

It will be understood that many of the details shown in the different apparatuses illustrated may, if desired, be used in some or all of the other forms of the apparatus.

The pumps which are shown in connection with the several forms of the apparatus may be operated from any suitable source of power, not here shown.

While I have shown and described my method and certain forms of apparatus for performing the same I wish it to be understood that I do not desire to be limited to the details shown and described as various modifications in the method and in the apparatus may occur to a person skilled in the art.

Having now fully described my invention, what I claim as new and desire to secure by Letters Patent is:

1. The method of converting heat and pressure energy into mechanical energy which comprises mixing vapor under pressure with a propellant under high pressure, expanding said vapor within and about said propellant and converting propellant and vapor pressure and heat energies into propellant velocity energy, and converting said propellant velocity energy into pressure energy and into mechanical energy.

2. The method of converting heat and pressure energy into mechanical energy which comprises mixing vapor under pressure with a propellant under high pressure, isothermally expanding said vapor within and about said propellant and converting propellant and vapor pressure and heat energies into propellant velocity energy, and converting said propellant velocity energy into pressure energy and into mechanical energy.

3. The method of converting heat and pressure energy into mechanical energy which comprises mixing vapor under pressure with a propellant under high pressure, expanding said vapor within and about said propellant and converting propellant and vapor pressure and heat energies into propellant velocity energy, separating expanded vapor from the propellant, and converting said propellant velocity energy into pressure energy and into mechanical energy.

4. The method of converting heat and pressure energy into mechanical energy which comprises mixing vapor under pressure with a propellant under high pressure, isothermally expanding said vapor within and about said propellant and converting propellant and fluid pressure and heat energies into propellant velocity energy, separating expanded fluid from said propellant, and converting said propellant velocity energy into pressure energy and into mechanical energy.

5. The method of converting pressure energy into mechanical energy which comprises subjecting a power element and a propellant to the pressure of an elastic fluid in a circuit, then mixing said propellant with said fluid at a reduced pressure, then converting said fluid pressure energy and said propellant pressure energy into propellant velocity energy, and then utilizing velocity energy to restore said propellant to said fluid pressure and to operate said power element.

6. The method of converting heat energy into propellant velocity energy which comprises mixing a relatively small quantity of liquid with a relatively large quantity of heated propellant under pressure, said propellant having a relatively high temperature of vaporization, then reducing the pressure of said mixture and transmitting heat from said propellant to said liquid, vaporizing said liquid and expanding said vapor within and about said propellant to increase the velocity energy of said propellant.

7. The method of converting heat energy into mechanical energy which comprises mixing a relatively small quantity of liquid with a relatively large quantity of heated propellant under pressure, then reducing the pressure of said mixture and transmitting heat from said propellant to said liquid, vaporizing said liquid, converting vapor expansion energy into propellant energy, and subsequently converting propellant energy into mechanical energy.

8. The method of producing power which comprises heating a propellant under pressure, transmitting heat from said propellant to a liquid to vaporize said liquid under pressure, converting the pressure of said vapor into vapor propellant velocity energy and converting said velocity energy into mechanical energy.

9. The method of converting pressure energy into mechanical energy which comprises mixing an elastic liquid under pressure with propellant under high pressure, then causing said fluid to expand within and about said propellant and converting fluid and propellant energies into propellant velocity energy at a reduced pressure, then separating expanded fluid from the propellant, converting a portion of said propellant velocity energy into pressure energy and converting another portion of said velocity energy into mechanical energy at a pressure in excess of the pressure at which said propellant is mixed with said fluid.

10. The method of converting pressure energy into mechanical energy which comprises mixing an elastic fluid under pressure with a propellant under pressure, causing said fluid to expand within and about said propellant and converting fluid and propellant pressure energies into propellant velocity energy, utilizing a portion of said velocity energy to create pressure energy, and converting another portion of said velocity energy into mechanical energy at a pressure in excess of said propellant energy.

11. The method of converting pressure energy into mechanical energy which comprises subjecting a propellant to the pressure of a fluid to cause the same to flow through a closed circuit from a higher pressure to a lower pressure within said circuit, introducing an elastic fluid under pressure into said circuit and mixing the same with said propellant at said lower pressure, causing said fluid to expand in said propellant to impart velocity energy thereto, converting at least a portion of said velocity energy into pressure energy, utilizing said pressure energy to introduce said propellant into a chamber containing a fluid under pressure and converting the remaining energy of said propellant into mechanical energy in said chamber.

12. The method of converting heat and pressure energy into mechanical energy which comprises heating a liquid propellant in a circuit, subjecting a liquid to the heat of said propellant to convert said liquid into vapor under pressure, subjecting said propellant to the pressure of said vapor to cause said propellant to flow through said circuit, mixing a portion of said vapor under pressure with said propellant to impart increased velocity energy to said propellant, and utilizing the velocity energy of said propellant to actuate a power element.

13. The method of converting heat and pressure energy into mechanical energy which comprises heating liquid propellant in a circuit, subjecting a liquid to the heat of said propellant to convert the liquid into vapor under pressure, subjecting said propellant to the pressure of said vapor to cause said propellant to flow through said circuit, mixing a portion of said vapor under pressure with said propellant, expanding said vapor in said propellant to impart increased velocity energy to said propellant, converting a portion of the velocity energy of said propellant into pressure energy, and utilizing the remaining energy of said propellant to actuate a power element.

14. The method of converting heat and pressure energy into liquid kinetic energy which comprises mixing an elastic fluid under pressure with a heated propellant under pressure, isothermally expanding said elastic fluid within and about said propellant to a lower pressure, separating said elastic fluid from said propellant, converting propellant energy into mechanical energy, condensing said elastic fluid, passing condensed fluid in heat exchange relation to elastic fluid after it has been separated from said propellant and prior to its condensation to extract superheat from said separated elastic fluid and preheat said condensed fluid, vaporizing said condensed fluid into an elastic fluid under pressure, and then again mixing the same with said propellant.

15. In a power apparatus, means for circulating liquid propellant under pressure through a circuit, means for mixing an elastic fluid under pressure with the propellant in said circuit and for expanding the fluid within and about said propellant and converting propellant and fluid pressure energy into propellant velocity energy, means for converting a portion of said velocity energy into propellant pressure energy and for converting another portion of said velocity energy into mechanical energy.

16. In a power apparatus, means for maintaining a propellant at a relative high pressure and temperature, means for mixing a relatively small quantity of volatile liquid with said propellant at said pressure, means for reducing the pressure on said mixture, vaporizing said liquid and converting vapor energy into propellant energy, and means for converting propellant energy into mechanical energy.

17. In a power apparatus, a circuit for liquid propellant including a pressure chamber, a power element within said chamber, means for subjecting the propellant in said chamber and said power element to the pressure of an elastic fluid, means for mixing a portion of said fluid with said propellant under pressure to convert the pressure energy of said fluid into propellant velocity energy at a reduced pressure, and means for utilizing the propellant energy to operate said power element.

18. In a power apparatus, a circuit for liquid propellant including a pressure chamber, a power element in said chamber, a mixing compartment and an expansion nozzle in said circuit, means for subjecting said power element and the propellant in said chamber to the pressure of an elastic fluid and for causing said propellant to flow from said pressure chamber to said mixing chamber and said expansion nozzle, means for mixing elastic fluid with said propellant in said mixing compartment and converting fluid pressure energy into propellant velocity energy in said expansion nozzle, and means for operating said power element with propellant energy.

19. In a power apparatus, a circuit for a liquid propellant including a chamber, a power element in said chamber, means for maintaining pressure in said chamber and subjecting said power element and the propellant in said chamber to said pressure, means for introducing an elastic fluid under pressure into said circuit, means for converting fluid energy into propellant velocity energy, means for separating fluid from said propellant at a relatively low pressure, and means beyond said separating means for causing said propellant to operate said power element.

20. In a power apparatus, a circuit for a liquid propellant including a chamber, a power element in said chamber, means for maintaining pressure in said chamber and subjecting said power element and the propellant in said chamber to said pressure, means for introducing an elastic fluid under pressure into said circuit, means for converting fluid and propellant pressure energies into propellant velocity energy at a reduced pressure, and means for utilizing said velocity energy to cause said propellant to enter said chamber and operate said power element.

21. In a power apparatus, a circuit for a liquid propellant including a chamber, a power element in said chamber, means for maintaining pressure in said chamber and subjecting said power element and the propellant in said chamber to said pressure, means for mixing an elastic fluid with said propellant and for then expanding said fluid within and about said propellant to convert fluid and propellant pressure energies into propellant velocity energy at a reduced pressure, means for then separating expanded fluid from said propellant, and means beyond said separating means for utilizing said velocity energy to cause said propellant to reenter said chamber and to operate said power element.

22. In a power apparatus, a circuit for a liquid propellant including a chamber, a power element in said chamber, means for maintaining pressure in said chamber and subjecting said power element and the propellant in said chamber to said pressure, means for introducing an elastic fluid under pressure into said circuit, means for converting fluid and propellant pressure energies into propellant velocity energy, means for utilizing a portion of said velocity energy to create pressure energy, and means for utilizing another portion of said velocity energy to operate said power element.

23. In a power apparatus, a circuit for a liquid propellant including a chamber, a power element in said chamber, means for maintaining pressure in said chamber and subjecting said power element and the propellant in said chamber to said pressure, means for introducing an elastic fluid under pressure into said circuit, means for converting fluid and propellant pressure energies into propellant velocity energy, means for utilizing said velocity energy to create pressure energy, and means for utilizing at least a portion of said pressure energy to operate said power element.

24. In a power apparatus, a circuit for a liquid propellant including a chamber, a power element in said chamber, means for maintaining pressure in said chamber and subjecting said power element and the propellant in said chamber to said pressure, means for introducing an elastic fluid under pressure into said circuit and for mixing said elastic fluid with said propellant at substantially said propellant pressure and converting pressure energy of said fluid into propellant velocity energy at a lower pressure, and means for utilizing said propellant energy for operating said power element.

25. In a power apparatus, a circuit for a liquid propellant including a pressure chamber, a mixing compartment, an expansion nozzle and a separating chamber, a power element in said pressure chamber, means for maintaining pressure within said pressure chamber and subjecting said power element and the propellant in said chamber to said pressure, means for introducing an elastic fluid under pressure into said circuit, means for mixing said fluid with said propellant in said mixing compartment, causing said mixture to flow through said expansion nozzle and expanding said fluid therein to convert fluid energy into propellant velocity energy, means for separating expanded fluid from said propellant in said separating chamber at a relatively low pressure, and means beyond said separating means for utilizing propellant energy to operate said power element.

26. In a power apparatus, a pressure chamber adapted to receive a liquid propellant, a mixing compartment, an expansion chamber, a separating chamber and a compression nozzle connected one with the other in the order named and connected with said pressure chamber, a power element in said pressure chamber, means for maintaining pressure in said pressure chamber and for causing said propellant to flow from said pressure chamber to said mixing compartment, means for mixing an elastic fluid with said propellant in said mixing compartment, causing said mixture to flow through said expansion chamber to expand said fluid therein and convert fluid energy into propellant velocity energy and to then flow through said separating chamber to separate expanded fluid from said propellant and for causing said propellant to flow through said compression nozzle to convert propellant velocity energy into pressure energy and to cause said propellant to operate said power element.

27. In a power apparatus, a circuit for a liquid propellant including a pressure chamber, a mixing compartment, an expansion nozzle, a separating chamber and a compression nozzle, a power element in said pressure chamber, means for maintaining pressure within said pressure chamber and subjecting the propellant therein and said power element to said pressure and for causing said propellant to flow from said pressure chamber through said circuit, means for mixing an elastic fluid with said propellant in said mixing compartment and causing said mixture to flow through said expansion nozzle to expand said fluid therein and convert fluid and propellant pressure energies into propellant velocity energy at a reduced pressure, and to then cause said mixture to flow through said separating chamber to separate expanded fluid from said propellant and then through said compression nozzle to convert propellant velocity energy into pressure energy and to cause said propellant to operate said power element.

28. In a power apparatus, a circuit for a liquid propellant including a pressure chamber, a mixing compartment, and an expansion nozzle, a power element in said pressure chamber, means for maintaining pressure within said pressure chamber and subjecting said power element and the propellant in said circuit to said pressure and for causing said propellant to flow from said pressure chamber to said mixing compartment and said expansion nozzle, means for mixing an elastic fluid under pressure with said propellant in said mixing compartment at substantially said propellant pressure and for converting the pressure energy of said fluid into propellant energy at a lower pressure in said expansion nozzle, and means for utilizing said propellant energy for operating said power element.

29. In a power apparatus, a circuit for liquid propellant including means for mixing an elastic fluid under pressure with a propellant under pressure, means for converting the energy of said fluid into propellant velocity energy, and means for converting a portion of said propellant velocity energy into pressure energy and for converting another portion thereof into mechanical energy at a pressure in excess of the pressure at which said propellant is mixed with said fluid.

30. In a power apparatus, a circuit for a liquid propellant including means for mixing elastic fluid under pressure with a propellant under pressure, means for causing said fluid to expand within and about said propellant and converting fluid and propellant pressure energies into velocity energy, means for utilizing said velocity energy to create pressure energy, and means for converting a portion of said pressure energy into mechanical energy at a pressure in excess of the pressure at which said propellant is mixed with said fluid.

31. In a power apparatus, a circuit for a liquid propellant, means for maintaining a propellant in said circuit at a high temperature and for heating a liquid to generate vapor under pressure and for subjecting the propellant in said circuit to the pressure of said vapor to cause said propellant to flow through said circuit, means for mixing a portion of said vapor under pressure with said propellant and causing said vapor to be superheated and to expand isothermally in and about said propellant to convert pressure energy into propellant velocity energy, means for separating expanded superheated vapor from said propellant, a power element arranged to be actuated by said propellant, a condenser, a conduit leading from said separating means to said condenser, an injector connected with said condenser to receive condensed vapor therefrom, and a return conduit connecting said injector with said heating means and having a part arranged in the first mentioned conduit.

EDWARD T. TURNER.